Patented Jan. 30, 1945

2,368,596

UNITED STATES PATENT OFFICE 2,368,596

PROCESS FOR REMOVING DISPERSED FRIEDEL-CRAFTS SLUDGE

Fulton L. Johnston, East Alton, and Norman B. Wilson, Alton, Ill., assignors to Shell Development Company, San Francisco, Calif., a corporation of Delaware No Drawing. Application March 16, 1943, Serial No. 479,392

8 Claims. (Cl. 196—44)

This invention relates to an improved process for treating liquid hydrocarbons. More particularly, it deals with the removal of dispersed and dissolved reaction products formed in said hydrocarbons when the latter are treated with Friedel-Crafts catalysts. This removal is effected by the addition of an organic amine which combines with said reaction products, causing their precipitation.

It is known that during the treatment of hydrocarbons with Friedel-Crafts catalysts to effect cracking, polymerization, alkylation, isomerization, oil refining, etc., sludges are formed which must be recovered completely. Two general types of sludges may occur, namely "settling" and "non-settling" sludges. The settling sludges form separate precipitate layers on standing. The non-settling sludges may be dispersed (insoluble) or dissolved (soluble). They do not form a precipitate layer on standing.

Precipitated and some of the dispersed Friedel-Crafts sludges have in the past been removed by settling, filtering and/or centrifuging, and some of the soluble sludges have been removed by hydrolysis, clay treatment, solvent extraction, etc. However, many of the non-settling sludges are not removed by such procedures, especially from hydrocarbon oils having a Saybolt Universal viscosity at 100° F. of greater than 600 seconds.

Accordingly, it is a purpose of this invention to remove the non-settling sludges formed in oils treated with Friedel-Crafts agents. Other incidental purposes are to increase the inhibitor susceptibility of such chemically treated hydrocarbon oils and to decrease the amount of clay required for the finishing treatment of such chemically refined lubricating hydrocarbon oils. Still other purposes will appear from time to time throughout the following description.

Generally, the instant improvement comprises adding to a liquid hydrocarbon which contains non-settling Friedel-Crafts sludges a small amount of a slightly oil-soluble organic amine, thoroughly mixing said amine with said liquid hydrocarbon whereby an oil-insoluble complex between these amines and sludges is formed, and then separating the resulting precipitate and unreacted amine, if any, from said liquid hydrocarbon.

Before discussing the process in greater detail the ingredients involved therein such as (1) the type of hydrocarbons treated, (2) the chemical treating agents, and (3) the organic amine, will be fully defined.

The hydrocarbons which may be treated according to this invention include all hydrocarbons which are liquid under conditions of the treatment, ranging from normally gaseous liquefiable hydrocarbons to highly viscous lubricating oil and petroleum plastics such as albino asphalt. This especially includes various mineral lubricating hydrocarbon oils having Saybolt Universal viscosities above about 50 seconds at 100° F. and, say, up to 150 seconds at 210° F. or higher, such as bright stocks. Lubricating oils which have been distilled and solvent extracted and particularly susceptible to treatment with Friedel-Crafts catalysts and are used in producing highly refined oils, such as insect spray oils, refrigerator oils, transformer oils, motor oils, turbine oils, aviation oils, etc.

Friedel-Crafts catalysts which are used in treating such hydrocarbons and form such non-settling sludges comprise particularly the fluorides of H, B, Be, Al, the chlorides of B, Al, Zn, Sn, Fe, the bromides of B, Al, Fe, etc., mixtures thereof with one another or with inactive halide salts, such as NaCl, AgCl, etc.

Organic amines suitable for the purpose should be but slightly soluble in the hydrocarbon oils, i. e. be substantially insoluble; or if soluble, only up to about a mol concentration which is equivalent to that of the non-settling sludges contained in the oil. Thus in general the solubility of the organic amines should be below about 10% and may be substantially nil, that is 1% or less. Reasons for these solubility requirements are as follows: the lower the oil-solubility of the organic amine, the lower is the solubility of the complex formed between the amine and the non-settling sludges. Hence, low oil-solubility of the amine causes theoretically complete precipitation of the sludge. On the other hand, if the amine is too oil-insoluble, there is danger of incomplete reaction between the amine and the sludge which may cause some of the sludge to remain in the oil. Therefore, a slight oil-solubility may be preferred. Moreover, the amine should be easily removable from the hydrocarbon oil by filtering, distillation, adsorption, or the like in case an excess is left in the oil.

Further, suitable organic amines must not be polymerizable in the presence of the sludges and therefore should not contain any reactive groups or olefinic double bonds. On the other hand, they may contain relatively stable polar radicals such as —OH, —O—, —S—, ≡N, etc.

Specific examples of suitable amines are: amyl amines, hexyl amines, cyclohexyl amine, heptyl, octyl, etc. amines; higher aliphatic amines such as may be obtained by the conversion of fatty acids to corresponding amines; various polyamines such as ethylene, propylene, butylene, etc. diamines, diethylene triamine, triethylene tetramine, tetra-ethylene pentamine, and other polyethylene polyamines, aliphatic or alicyclic polyamines; alkanolamines such as mono-, di- or triethanol amines, diamino propanols, butanols, pentanols, etc.; amino diols, amino propane diol, amino butane diol; amino ethers and their corresponding thio-ethers including hydroxy amines of diamino ethers or thioethers, such as beta amino diethyl ether, beta or gamma-amino dipropyl or isopropyl ethers, beta-beta'-diamino diethyl ether, beta-amino-beta'-hydroxy diethyl ether; beta-beta' or gamma-gamma'-diamino diisopropyl ethers, etc. The polyethylene polyamines are preferred, and particularly tetraethylene pentamine has been found to be very satisfactory in precipitating hydrocarbon-soluble metal halide-hydrocarbon complexes from mineral hydrocarbon oils of the lubricating oil range by forming a flocculent precipitate which may readily be removed by settling, centrifuging or filtering.

In choosing an amine from the above list, sight must not be lost of the maximum solubility requirements which may change with different oils.

Ammonia also forms a precipitate with the oil-soluble Friedel-Crafts sludges, but the precipitate fails to settle readily, being in the nature of a pepper sludge, and slimy, so that it is very difficult to remove it from the oil. Therefore ammonia is not a practical precipitating agent. Aliphatic nitro compounds, such as nitromethanes, have also been tried as precipitating agents and have been found to form precipitates, but unless they are removed quickly from the oil they tend to oxidize the oil and cause it to darken in color very rapidly. Accordingly, such compounds are not desirable as precipitating agents, in that they tend to defeat the purpose of the chemical treatment of the oil.

The following is a detailed description of our process.

First, the presence of water in the hydrocarbon oil to be treated must be considered. If the hydrocarbon oil to be refined contains any water, this water must be removed prior to treatment with the Friedel-Crafts catalyst to prevent its hydrolysis. For example, water may normally be removed easily by treatment with about 2% by weight of 80-85% sulfuric acid.

The hydrocarbon oil freed from water is then contacted with a Friedel-Crafts catalyst in an approved manner whereby both "settling" and "non-settling" sludges are formed. The settling sludges are then removed from the oil before the organic amine is added so that none of the amine will be spent in combining with the precipitated sludges. These sludges may readily be removed by mechanical means such as settling, filtering or centrifuging.

It is very desirable that the hydrocarbon oil thus chemically treated be free from acid gases such as hydrogen sulfide, hydrogen chloride, sulfur trioxide, etc. before the organic amine is added or it will react with these gases rather than form insoluble precipitates with the non-settling sludges in the hydrocarbon. Acid gases, if present, may be pre-removed in any suitable manner as by distillation, solvent extraction, blowing with air, nitrogen, carbon dioxide, flue gases, etc. Heating of the hydrocarbon oil during blowing to, say, not over about 125° F. if air is used, and as high as about 200° F. if a fully inert gas is used, may be advantageous.

To the hydrocarbon liquid, free of acid gases and precipitated sludges, is then added an organic amine of the type above-mentioned in an amount sufficient to react with most if not all of the non-settling sludges whereby an easily settling precipitate is formed. To determine the required proper amount small consecutive quantities of the amine are added to a sample of the treated oil, and the oil is filtered between additions. When no more or only slight precipitation occurs upon further addition the amount added is sufficient.

The amount of amine required to precipitate the non-settling sludge will vary with the amount of non-settling sludge in the oil, which in turn depends upon the base oil treated, the conditions of the treatment, and the amount of catalyst used. For example, in a 3% by weight aluminum chloride treatment of an extracted Mid-Continent neutral oil having a Saybolt Universal viscosity at 100° F. of 750 seconds, it has been found that between .20-25% by weight of tetraethylene pentamine is satisfactory. Since this oil contained approximately 5% sludge it is estimated that approximately 2% by weight of the amine based on the amount of oil treated is satisfactory for the precipitation of 40% sludge.

The quantity of non-settling sludge in the oil may vary from a small fraction of a percent to 10% and in some cases up to about 30% or 40% of the oil. As indicated, some factors influencing the quantity of soluble sludge retained are the type of hydrocarbon treated and the type of Friedel-Crafts catalyst used in the treatment. Generally, low molecular weight hydrocarbons contain smaller amounts of non-settling sludges than do the higher molecular weight hydrocarbons and therefore a correspondingly lesser amount of the amine is required in treating the low molecular weight hydrocarbons. Highly paraffinic oils normally yield more pepper sludges than more napththenic oils. If a relatively viscous hydrocarbon liquid such as a lubricating oil is treated, the amount of amine may be somewhat less than required to combine chemically with all the non-settling sludge because the precipitate which is formed is usually of a tacky and flocculent nature and tends to adsorb unreacted dispersed pepper sludges.

After the amine is added to the hydrocarbon liquid, it is mixed thoroughly to insure intimate contact between the amine and the non-settling sludges in the hydrocarbon liquid. If the hydrocarbon liquid is very viscous, it may be heated to a moderately elevated temperature to facilitate more intimate contact.

After completed mixing the mixture may be allowed to rest or be subjected to non-turbulent slow agitation to cause agglomeration of precipitated particles. This increases the ease by which the precipitate can be removed from the hydrocarbon liquid.

The resulting precipitate may be removed in any suitable manner such as settling, centrifuging or filtering; contact with an adsorbent such as charcoal, fuller's earth, activated clay, or natural or synthetic adsorbent may be desirable to adsorb excess amines and other harmful impurities remaining in the liquid hydrocarbon, thereby giving the oil a finishing treatment. Excess organic amine, if any, may also be removed by other means as by distillation, steam stripping, extraction, or the like.

The amount of clay or other adsorbent required to finish an oil after precipitating sludge with an organic amine is but a small fraction of the amounts which would be required had the precipitation been omitted. The saving in clay thus accomplished represents a material economic advantage and more than pays for the cost of organic amine consumed in the process.

Moreover, the products obtained by the improvement are considerably more stable than those formerly obtained by similar treatments, other conditions being equal, but omitting the precipitation with organic amine. For example, in the case of mineral lubricating oils the inhibitor susceptibility is greatly increased, thereby permitting the production of very high stable oils containing a minimum amount of an inhibitor.

*Example I*

An 1800 gm. sample of solvent-extracted Mid-Continent of 90 viscosity index lubricating oil, having a Saybolt Universal viscosity at 100° F. of 750 seconds, was mixed with 54 grams (about 3% by weight) of powdered anhydrous aluminum chloride and stirred for about 3 hours.

During the first hour of the treatment the mixture of lubricating oil and anhydrous aluminum chloride was agitated and slowly heated to a temperature between about 250 and 300° F., and then maintained at this temperature for about two hours. During this time, hydrogen chloride and hydrogen sulfide gases and sludges were evolved. The mixture was then allowed to rest for several hours at room temperature, and the oil was separated by decantation from the black, tarry precipitated sludge. The decanted oil was vigorously blown with air at a temperature between about 100° F. and 125° F. to remove hydrogen sulfide and hydrogen chloride. The resulting oil had a purple to black appearance and contained non-settling aluminum chloride sludges. To this oil was added .2% by weight of tetra-ethylene pentamine. The resulting mixture was then agitated for about 30 minutes at a temperature of about 200° F. Six grams of No. 2 Attapulgus clay and 1 gram of Hyflo-Supercel were added and agitation continued for an additional 30 minutes. The precipitate formed was removed easily by filtration. The filtered oil was then steam stripped at a temperature of about 400° to 500° F. for about an hour to remove light ends formed during treatment with aluminum chloride. The stripped oil was percolated through 30/60 mesh No. 1 Attapulgus clay to a yield of one gallon of finished oil per pound of clay. For comparison, a duplicate sample treated without the amine gave a yield of only 0.25 gallon oil per pound of No. 1 clay.

The finished oil was much lighter in color than the original base stock percolated through No. 1 clay to the yield of one gallon per pound and had approximately the same viscosity at 100° F.

To both percolated oils, the original and the treated, was added 0.20% by weight di-ter-butyl p-methyl phenol and their stabilities against oxidation were determined in a bomb test in which a temperature of 300° F. and oxygen pressure of 100 p. s. i. and both copper and iron wire catalysts were used. The life of the oil was taken as the time at which oxygen absorption became noticeable as indicated by the properties of oil samples taken at intervals. The life of the treated and inhibited oil was 270 minutes as compared with a life of less than 75 minutes for the neutral percolated only and then inhibited.

A comparable sample, which had been identically processed and inhibited except that the amine treatment was omitted, had a life of less than 120 minutes.

*Example II*

A 3000 gram sample of solvent-extracted Mid-Continent Bright Stock of 90 viscosity index, having a Saybolt Universal viscosity at 210° F. of 150 seconds was mixed with 90 grams (3% by weight) of granular anhydrous aluminum chloride and stirred for two hours at 260° F.

This mixture was then allowed to settle for two days after which it was decanted and allowed to settle an additional three days. Very little more sludge separated from the decanted oil. In an attempt to remove the suspended sludge, the oil was contacted at 250° F. with about 3% Attapulgus No. 1 clay and subjected to filtration. Very little of the oil could be filtered. A duplicate finishing treatment containing in addition to the Attapulgus clay 1% by weight of tetra-ethylene pentamine resulted in an easily filtered clear oil.

I claim as my invention:

1. In a process for treating a mineral lubricating oil with a Friedel-Crafts catalyst wherein a hydrocarbon liquid containing a non-settling sludge is produced, the improvement comprising adding to said oil containing said non-settling sludge an amount of a polyethylene polyamine which is less than about 10% soluble in said oil, whereby the non-settling sludge is precipitated, and removing the precipitate from said oil, said amount being sufficient to precipitate substantially all of said non-settling sludge.

2. The process of claim 1 wherein said oil has a Saybolt Universal viscosity at 100° F. of greater than 600 seconds.

3. The process of claim 1 wherein said Friedel-Crafts catalyst is aluminum chloride.

4. The process of claim 1 wherein said organic amine is tetra-ethylene pentamine.

5. In a process for treating a mineral lubricating oil with a Friedel-Crafts catalyst wherein an oil containing a non-settling sludge and free acid gases is produced, the improvement comprising removing said free acid gases from said oil containing said non-settling sludge, adding to said oil an amount of a polyethylene polyamine which is less than about 10% soluble in said oil, thoroughly mixing said polyamine and said oil, whereby the non-settling sludge is precipitated, and removing said precipitate from said oil, said amount being sufficient to precipitate substantially all of said non-settling sludge.

6. The process of claim 5 wherein said free acid gases are removed by air blowing.

7. In a process for treating a mineral lubricating oil with a Friedel-Crafts catalyst wherein an oil containing a non-settling sludge and free acid gases is produced, the improvement comprising removing said free acid gases from said oil containing said non-settling sludge, adding to said oil an amount of a polyethylene polyamine which is less than about 10% soluble in said oil, thoroughly mixing said polyamine and said oil, whereby the non-settling sludge is precipitated, and removing said precipitate from said oil, said amount being in excess of that required to precipitate all of said sludge, and removing said excess.

8. The process of claim 7 wherein the excess of polyamine is removed by clay treatment.

NORMAN B. WILSON.
FULTON L. JOHNSTON.